(12) United States Patent
Ikarashi

(10) Patent No.: US 11,251,945 B2
(45) Date of Patent: Feb. 15, 2022

(54) SECURE AGGREGATE MAXIMUM SYSTEM, SECURE AGGREGATE MINIMUM SYSTEM, SECURE COMPUTATION APPARATUS, SECURE AGGREGATE MAXIMUM METHOD, SECURE AGGREGATE MINIMUM METHOD, AND PROGRAM

(71) Applicant: NIPPON TELEGRAPH AND TELEPHONE CORPORATION, Tokyo (JP)

(72) Inventor: Dai Ikarashi, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 17/049,344

(22) PCT Filed: Apr. 22, 2019

(86) PCT No.: PCT/JP2019/016986
§ 371 (c)(1),
(2) Date: Oct. 21, 2020

(87) PCT Pub. No.: WO2019/208485
PCT Pub. Date: Oct. 31, 2019

(65) Prior Publication Data
US 2021/0243014 A1    Aug. 5, 2021

(30) Foreign Application Priority Data
Apr. 25, 2018    (JP) .............................. JP2018-084115

(51) Int. Cl.
*H04L 29/06* (2006.01)
*H04L 9/08* (2006.01)
(Continued)

(52) U.S. Cl.
CPC .............. *H04L 9/085* (2013.01); *G06F 17/16* (2013.01); *H04L 9/0631* (2013.01)

(58) Field of Classification Search
None
See application file for complete search history.

(56) References Cited

U.S. PATENT DOCUMENTS

2011/0305333 A1* 12/2011 Jacobson .............. H04L 9/0844
380/44
2013/0272521 A1* 10/2013 Kipnis .................. H04L 9/0833
380/44
(Continued)

FOREIGN PATENT DOCUMENTS

JP    2012-154968 A    8/2012

OTHER PUBLICATIONS

Karashi et al., "Secure Database Operations Using An Improved 3-party Verifiable Secure Function Evaluation", The 2011 Symposium on Cryptography and Information Security, Kokura, Japan, The Institute of Electronics, Information and Communication Engineers, Jan. 25-28, 2011, 20 pages including English Translation.
(Continued)

*Primary Examiner* — Maung T Lwin
(74) *Attorney, Agent, or Firm* — Xsensus LLP

(57) ABSTRACT

An aggregate maximum is efficiently obtained while keeping confidentiality. A flag converting part (12) converts a form of a share of a flag representing a last element of a group. A flag applying part (13) generates a share of a vector in which a value of a value attribute is set if a flag representing the last element of the group is true, and a predetermined value is set if the flag is false. A sorting part (14) generates a share of a sorted vector obtained by sorting the vector with a permutation which moves elements so that the last elements of each group are sequentially arranged from beginning. An output part (15) generates and outputs a
(Continued)

share of a vector representing a maximum of each group from the sorted vector.

10 Claims, 5 Drawing Sheets

(51) Int. Cl.
*G06F 17/16* (2006.01)
*H04L 9/06* (2006.01)

(56) References Cited

U.S. PATENT DOCUMENTS

2015/0149763 A1* 5/2015 Kamara ............... H04L 63/0428
713/150
2016/0321958 A1* 11/2016 Ikarashi ................. G06F 21/60

OTHER PUBLICATIONS

Karashi et al.,"A Design and an Implementation of Super-high-speed Multi-party Sorting: The Day When Multi-party Computation Reaches Scripting Languages", Computer Security Symposium 2017, Oct. 23-25, 2017, 9 pages (See English Abstract).
Hamada K. et al.: "An Algorithm for Computing Aggregate Median on Secure Function Evaluation", Proceedings of Computer Security Symposium 2012, vol. 2012, No. 3, Oct. 23, 2012 (Oct. 23, 2012), pp. 509-516.

* cited by examiner

SECURE AGGREGATE MAXIMUM SYSTEM, SECURE AGGREGATE MINIMUM SYSTEM, SECURE COMPUTATION APPARATUS, SECURE AGGREGATE MAXIMUM METHOD, SECURE AGGREGATE MINIMUM METHOD, AND PROGRAM

CROSS-REFERENCE TO RELATED APPLICATIONS

The present application is based on PCT filing PCT/JP2019/016986, filed Apr. 22, 2019, which claims priority to JP 2018-084115, filed Apr. 25, 2018, the entire contents of each are incorporated herein by reference.

TECHNICAL FIELD

The present invention relates to a secure computation technique, and, particularly, relates to a technique of computing an aggregate function while keeping confidentiality.

BACKGROUND ART

An aggregate function is an operation for obtaining statistics grouped based on a value of a key attribute when a table includes a key attribute and a value attribute. The aggregate function is also referred to as a group-by operation. The key attribute is an attribute to be used for grouping records of the table, and, examples of the key attribute can include, for example, an official position, gender, or the like. The value attribute is an attribute to be used for computing statistics, and, examples of the value attribute can include, for example, salary, body height, or the like. The group-by operation is, for example, an operation for obtaining average body height by gender in a case where the key attribute is gender, or the like. The key attribute may be a composite key including a plurality of attributes, and, for example, in a case where the key attributes are gender and age, the group-by operation may be an operation for obtaining average body height of males in their teens, average body height of males in their twenties, . . . . Non-patent literature 1 discloses a method for performing the group-by operation using secure computation.

An aggregate maximum is one of the aggregate functions, and is an operation for obtaining a maximum of a desired value attribute for each group when the table is grouped based on the value of the key attribute. The aggregate maximum is also referred to as a group-by maximum. The group-by maximum is, for example, an operation for obtaining a maximum amount of salary of males in their teens, a maximum amount of salary of males in their twenties, . . . , when the key attributes are gender and age, and the value attribute is salary.

An aggregate minimum is one of the aggregate functions, and is an operation for obtaining a minimum of a desired value attribute for each group when the table is grouped based on the value of the key attribute. The aggregate minimum is also referred to as a group-by minimum. The group-by minimum is, for example, an operation for obtaining a minimum amount of salary of males in their teens, a minimum amount of salary of males in their twenties, . . . , when the key attributes are gender and age, and the value attribute is salary.

PRIOR ART LITERATURE

Non-Patent Literature

Non-patent literature 1: Dai Ikarashi, Koji Chida, Koki Hamada, and Katsumi Takahashi, "Secure Database Operations Using An Improved 3-party Verifiable Secure Function Evaluation", The 2011 Symposium on Cryptography and Information Security, 2011.

SUMMARY OF THE INVENTION

Problems to be Solved by the Invention

In a conventional secure computation technique, the number of times of communication of log(n) where n is the number of subjects to perform computation is required to obtain a group-by maximum/minimum, which is inefficient.

In view of the technical problem as described above, an object of the present invention is to provide a technique which is capable of efficiently obtaining a group-by maximum/minimum while keeping confidentiality.

Means to Solve the Problem

To solve the above-described problem, a secure aggregate maximum system according to a first aspect of the present invention is a secure aggregate maximum system including a plurality of secure computation apparatuses, m being an integer equal to or greater than 2, $[v]:=[v_0], \ldots, [v_{m-1}]$ being a share obtained by secret sharing a desired value attribute $v:=v_0, \ldots, v_{m-1}$ when a table including a key attribute and a value attribute is stably sorted based on a value of the value attribute and a value of the key attribute, $[e]:=[e_0], \ldots, [e_{m-1}]$ being a share obtained by secret sharing a flag $e:=e_0, \ldots, e_{m-1}$ indicating that a last element of each group is true and other elements are false when the table is grouped based on the value of the key attribute, $\{\{\sigma\}\}$ being a share obtained by secret sharing a permutation σ which moves elements so that the last elements of each group are sequentially arranged from beginning when the table is grouped based on the value of the key attribute, and g being a maximum number of the groups, each of the secure computation apparatuses comprising a flag applying part configured to generate a share [f] which becomes a vector $f:=f_0, \ldots, f_{m-1}$, when reconstructed, by setting $[v_i]$ at $[f_i]$ if $[e_i]$ is true, and setting a predetermined fixed value at $[f_i]$ if $[e_i]$ is false for each integer i equal to or greater than 0 and equal to or less than m−1 using the share [v] and the share [e], a sorting part configured to generate a share [σ(f)] which becomes a sorted vector σ(f) obtained by sorting the vector f with the permutation σ, when reconstructed, using the share [f] and the share $\{\{\sigma\}\}$, and an output part configured to generate a share [x] which becomes a vector $x:=\sigma(f)_0, \ldots, \sigma(f)_{min(g,m)-1}$ representing a maximum of each group, when reconstructed, using the share [σ(f)].

To solve the above-described problem, a secure aggregate minimum system according to a second aspect of the present invention is a secure aggregate minimum system including a plurality of secure computation apparatuses, m being an integer equal to or greater than 2, $[v]:=[v_0], \ldots, [v_{m-1}]$ being a share obtained by secret sharing a desired value attribute $v:=v_0, \ldots, v_{m-1}$ when a table including a key attribute and a value attribute is stably sorted based on a value of the value attribute and a value of the key attribute, $[e]:=[e_0], \ldots, [e_{m-1}]$ being a share obtained by secret sharing a flag $e:=e_0, \ldots, e_{m-1}$ indicating that a last element of each group is true and other elements are false when the table is grouped based on the value of the key attribute, $\{\{\sigma\}\}$ being a share obtained by secret sharing a permutation σ which moves elements so that the last elements of each group are sequentially arranged from beginning when the table is grouped based on the value of the key attribute, and g being a maximum number of the groups, each of the secure computation apparatuses comprising a flag shifting part configured to generate a share [e'] which becomes a flag $e':=e'_0, \ldots, e'_{m-1}$, when reconstructed, by setting $[e_{i-1}]$ at $[e'_i]$ for each integer i equal to or greater than 1 and equal to or less than m−1 and setting true at $[e'_0]$ using the share [e], a flag applying part configured to generate a share [f'] which becomes a vector $f':=f'_0, \ldots, f'_{m-1}$, when reconstructed, by setting $[v_i]$ at $[f'_i]$ if $[e'_i]$ is true, and setting a predetermined fixed value at $[f'_i]$ if $[e'_i]$ is false for each integer i equal to or greater than 0 and equal to or less than m−1 using the share [v] and the share [e'], a sorting part configured to generate a share [σ(f')] which becomes a sorted vector σ(f') obtained by sorting the vector f' with the permutation σ, when reconstructed, using the share [f'] and the share {{σ}}, and an output part configured to generate a share [x'] which becomes a vector $x':=\sigma(f')_0, \ldots, \sigma(f')_{min(g,m)-1}$ representing a minimum of each group, when reconstructed, using the share [σ(f')].

Effect of the Invention

According to a secure aggregate maximum/minimum technique of the present invention, it is possible to efficiently obtain a group-by maximum/minimum with the number of times of communication of O(1) while keeping confidentiality.

DETAILED DESCRIPTION OF THE EMBODIMENTS

Figure 1:
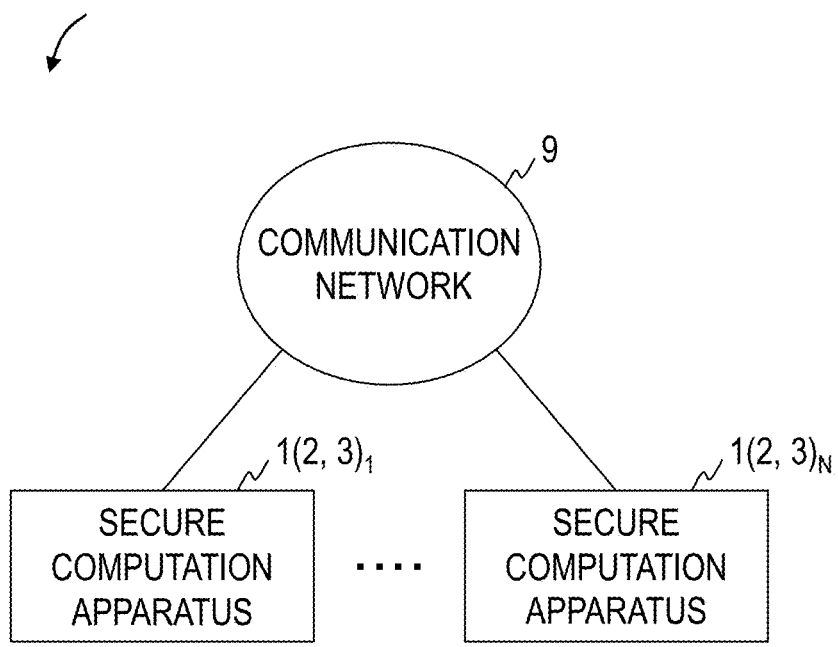
FIG. 1 is a diagram illustrating a functional configuration of a secure aggregate maximum/minimum system.

Embodiments of the present invention will be described in detail below. Note that the same reference numerals will be assigned to components having the same functions in the drawings, and overlapped description will be omitted.

$[x] \in [F]$ indicates that a certain value x is concealed through secret sharing, or the like, on an arbitrary ring F. $\{b\} \in \{B\}$ indicates that a certain value b of one bit is concealed through secret sharing, or the like, on a ring B which can represent one bit. $\{\{s\}\} \in \{\{S_m\}\}$ indicates that a certain permutation s which belongs to a set $S_m$ of permutations of m elements is concealed through secret sharing, or the like. Hereinafter, a secret shared value will be referred to as a "share".

In sort processing (including stable sort) in secure computation used in the embodiment, for example, sort disclosed in the following Reference literature 1 can be used. Concerning the share {{s}} of the permutation s, it is only necessary to use a hybrid permutation {{π}} disclosed in the following Reference literature 1.

[Reference literature 1] Dai Ikarashi, Koki Hamada, Ryo Kikuchi, and Koji Chida, "A Design and an Implementation of Super-high-speed Multi-party Sorting: The Day When Multi-party Computation Reaches Scripting Languages", Computer Security Symposium 2017.

First Embodiment

Secure Aggregate Maximum System

A first embodiment of the present invention is a secure aggregate maximum system and method for obtaining a group-by maximum. A configuration example of the secure aggregate maximum system 100 of the first embodiment will be described with reference to FIG. 1. The secure aggregate maximum system 100 includes N (≥2) secure computation apparatuses $1_1, \ldots, 1_N$. In the present embodiment, the secure computation apparatuses $1_1, \ldots, 1_N$ are respectively connected to a communication network 9. The communication network 9 is a communication network of a circuit switching system or a packet switching system, configured so that respective connected apparatuses can perform communication with each other, and, for example, the Internet, a local area network (LAN), a wide area network (WAN), or the like, can be used. Note that the respective apparatuses do not necessarily have to be able to perform communication online via the communication network 9. For example, it is also possible to employ a configuration where information which is to be input to the secure computation apparatuses $1_1, \ldots, 1_N$ is stored in a portable recording medium such as a magnetic tape and a USB memory, and the information is input from the portable recording medium to the secure computation apparatuses $1_1, \ldots, 1_N$ offline.

Figure 2:
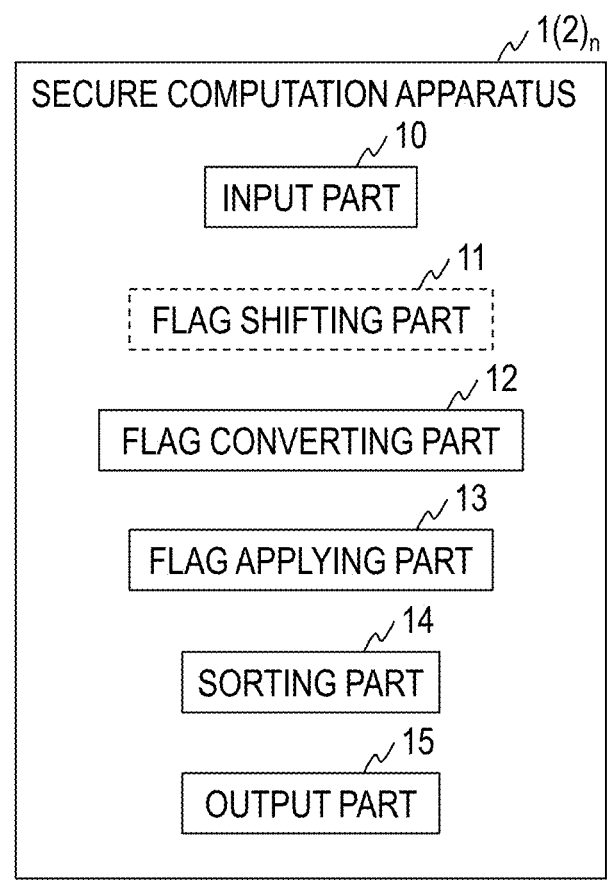
FIG. 2 is a diagram illustrating a functional configuration of a secure computation apparatus.

A configuration example of the secure computation apparatuses $1_n$ (n=1, . . . , N) included in the secure aggregate maximum system 100 of the present embodiment will be described with reference to FIG. 2. For example, as illustrated in FIG. 2, the secure computation apparatus $1_n$ includes an input part 10, a flag converting part 12, a flag applying part 13, a sorting part 14 and an output part 15. By this secure computation apparatus $1_n$ (1≤n≤N) performing processing in each step which will be described later while cooperating with another secure computation apparatus $1_{n'}$ (n'=1, . . . , N, where n≠n'), the secure aggregate maximum method of the first embodiment is implemented.

The secure computation apparatus $1_n$ is a special apparatus configured by a special program being loaded to a publicly-known or dedicated computer having, for example, a central processing unit (CPU), a main memory (RAM: random access memory), or the like. The secure computation apparatus $1_n$, for example, executes respective kinds of processing under control by the central processing unit. Data input to the secure computation apparatus $1_n$ and data obtained through the respective kinds of processing are stored in, for example, the main memory, and the data stored in the main memory is read out to the central processing unit as necessary and is utilized for other processing. At least part of respective processing parts of the secure computation apparatus $1_n$ may be configured with hardware such as an integrated circuit.

Figure 3:
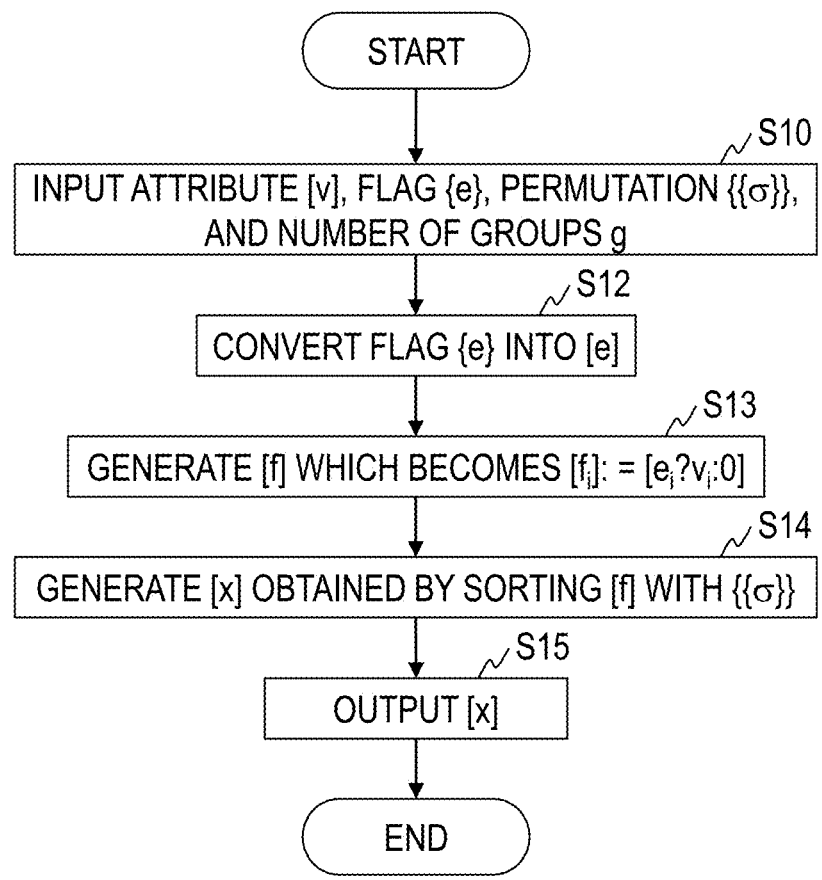
FIG. 3 is a diagram illustrating a processing procedure of a secure aggregate maximum method.

A processing procedure of the secure aggregate maximum method to be executed by the secure aggregate maximum system 100 of the first embodiment will be described with reference to FIG. 3.

In step S10, the input part 10 of each secure computation apparatus $1_n$ receives a share $[v] \in [F]^m$ obtained by concealing a value attribute $v \in F^m$ through secret sharing, a share $\{e\} \in \{B\}^m$ obtained by concealing a flag $e \in B^m$ through secret sharing, a share $\{\{\sigma\}\} \in \{\{S_m\}\}$ obtained by concealing a permutation σ through secret sharing, and a maximum number of groups g, as input. m is an integer equal to or greater than 2. The input part 10 outputs the share $\{e\}$ of the flag e to the flag converting part 12, outputs the share $[v]$ of the value attribute v to the flag applying part 13, and outputs the share $\{\{\sigma\}\}$ of the permutation $\sigma$ to the sorting part 14.

The value attribute v is a value attribute after a table is stably sorted in ascending order of a value attribute and a key attribute. Note that stable sort is an operation of storing order of elements of the same value in a case where elements of the same value exist, among sort operations. For example, if a table sorted in order of employee number is stably sorted with gender, a sort result in which order of the employee number is kept in each type of gender can be obtained. In other words, the value attribute v is a value attribute after a table is sorted in ascending order of a value of the value attribute for each group. Hereinafter, there is a case where each element of $[v] \in [F]^m$ is referred to by $[v_i] \in [F]$ (i=0, . . . , m−1).

The flag e is a flag representing a boundary of groups. For example, the flag e is a flag such that, when the table is stably sorted with a key attribute, and when records having the same value of the key attribute are put into the same group, a value corresponding to a last element (that is, an element immediately before the boundary of groups) of each group is true (for example, 1), and values corresponding to the other elements are false (for example, 0). Hereinafter, there is a case where each element of $\{e\} \in \{B\}^m$ is referred to by $\{e_i\} \in \{B\}$ (i=0, . . . , m−1).

The permutation $\sigma$ is a permutation which arranges values of key attributes of each group from the head one by one. For example, the permutation $\sigma$ is a permutation which moves elements so that, when the table is stably sorted with a key attribute, and when records having the same value of the key attribute are put into the same group, the last elements of each group are sequentially arranged from beginning, and subsequently, other elements are sequentially arranged. The share $\{\{\sigma\}\}$ of the permutation $\sigma$ is only required to be configured using the hybrid permutation $\{\{\pi\}\}$ disclosed in the above-described Reference literature 1.

The maximum number of groups g is the number of combinations of values which the key attribute can take, that is, the number of types of values which the key attribute can take.

In step S12, the flag converting part 12 of each secure computation apparatus $\mathbf{1}_n$ converts the share $\{e\} \in \{B\}^m$ of the flag e into a share $[e] \in [F]^m$ through secret sharing on an arbitrary ring F. The flag converting part 12 outputs the share $[e]$ of the flag e to the flag applying part 13.

In step S13, the flag applying part 13 of each secure computation apparatus $\mathbf{1}_n$ generates a share $[f] \in [F]^m$ which becomes a vector $f:=f_0, \ldots, f_{m-1} \in F$, when reconstructed, by setting $[f_i]:=[e_i?v_i:0]$ for each integer i equal to or greater than 0 and equal to or less than m−1 using the share $[v]$ of the value attribute v and the share $[e]$ of the flag e. Here, "?" is a conditional operator (ternary operator). In other words, when $[e_i]$ is true (for example, $[e_i]=[1]$), $[f_i]:=[v_i]$ is set, while, when $[e_i]$ is false (for example, $[e_i]=[0]$), $[f_i]:=[0]$ is set. A value set when $[e_i]=[0]$ does not have to be 0, and may be any value if the value is a value which the value attribute v never takes. The vector f becomes a vector in which, when records having the same value of the key attribute are put into the same group when the table is stably sorted with the key attribute, at the last element $f_i$ of each group, a value $v_i$ of a value attribute corresponding to the element is set, and at other elements, 0 is set. In other words, the vector f becomes a vector which has a maximum of each group and 0 as elements. The flag applying part 13 outputs a share $[f]$ of the vector f to the sorting part 14.

In step S14, the sorting part 14 of each secure computation apparatus $\mathbf{1}_n$ generates a share $[\sigma(f)] \in [F]^m$ which becomes a sorted vector $\sigma(f)$ obtained by sorting the vector f with the permutation $\sigma$, when reconstructed, using the share $[f]$ of the vector f and the share $\{\{\sigma\}\}$ of the permutation $\sigma$. Hereinafter, there is a case where each element of $[\sigma(f)] \in [F]^m$ is referred to by $[\sigma(f)_i] \in [F]$ (i=0, . . . , m−1). The sorted vector $\sigma(f)$ becomes a vector in which, at elements corresponding to the number of groups from the head, a value of the last element (that is, a maximum of each group) when the table is sorted for each group, is set, and at subsequent elements, 0 is set. The sorting part 14 outputs the share $[\sigma(f)]$ of the sorted vector $\sigma(f)$ to the output part 15.

In step S15, the output part 15 of each secure computation apparatus $\mathbf{1}_n$ generates a share $[x] \in [F]^{min(g,m)}$ which becomes a vector $x:=\sigma(f)_0, \ldots, \sigma(f)_{min(g,m)-1}$ representing the maximum of each group, when reconstructed, from the share $[\sigma(f)]$ of the sorted vector $\sigma(f)$, and outputs the share $[x]$ of the maximum x.

Second Embodiment

Secure Aggregate Minimum System

A second embodiment of the present invention is a secure aggregate minimum system and method for obtaining a group-by minimum. A configuration example of a secure aggregate minimum system 101 of the second embodiment will be described with reference to FIG. 1. The secure aggregate minimum system 101 includes N ($\geq 2$) secure computation apparatuses $\mathbf{2}_1, \ldots, \mathbf{2}_N$. In the present embodiment, the secure computation apparatuses $\mathbf{2}_1, \ldots, \mathbf{2}_N$ are respectively connected to the communication network 9. The communication network 9 is a communication network of a circuit switching system or a packet switching system, configured so that respective connected apparatuses can perform communication with each other, and, for example, the Internet, a local area network (LAN), a wide area network (WAN), or the like, can be used. Note that the respective apparatuses do not necessarily have to be able to perform communication online via the communication network 9. For example, it is also possible to employ a configuration where information which is to be input to the secure computation apparatuses $\mathbf{2}_1, \ldots, \mathbf{2}_N$ is stored in a portable recording medium such as a magnetic tape and a USB memory, and the information is input from the portable recording medium to the secure computation apparatuses $\mathbf{2}_1, \ldots, \mathbf{2}_N$ offline.

A configuration example of the secure computation apparatus $\mathbf{2}_n$ (n=1, . . . , N) included in the secure aggregate minimum system 101 of the present embodiment will be described with reference to FIG. 2. For example, as illustrated in FIG. 2, the secure computation apparatus $\mathbf{2}_n$ further includes a flag shifting part 11 in addition to processing parts provided at the secure computation apparatus $\mathbf{1}_n$ included in the secure aggregate maximum system 100 of the first embodiment. By this secure computation apparatus $\mathbf{2}_n$ ($1 \leq n \leq N$) performing processing in each step which will be described later while cooperating with another secure computation apparatus $\mathbf{2}_{n'}$ (n'=1, . . . , N, where n≠n'), the secure aggregate minimum method of the second embodiment is implemented.

Figure 4:
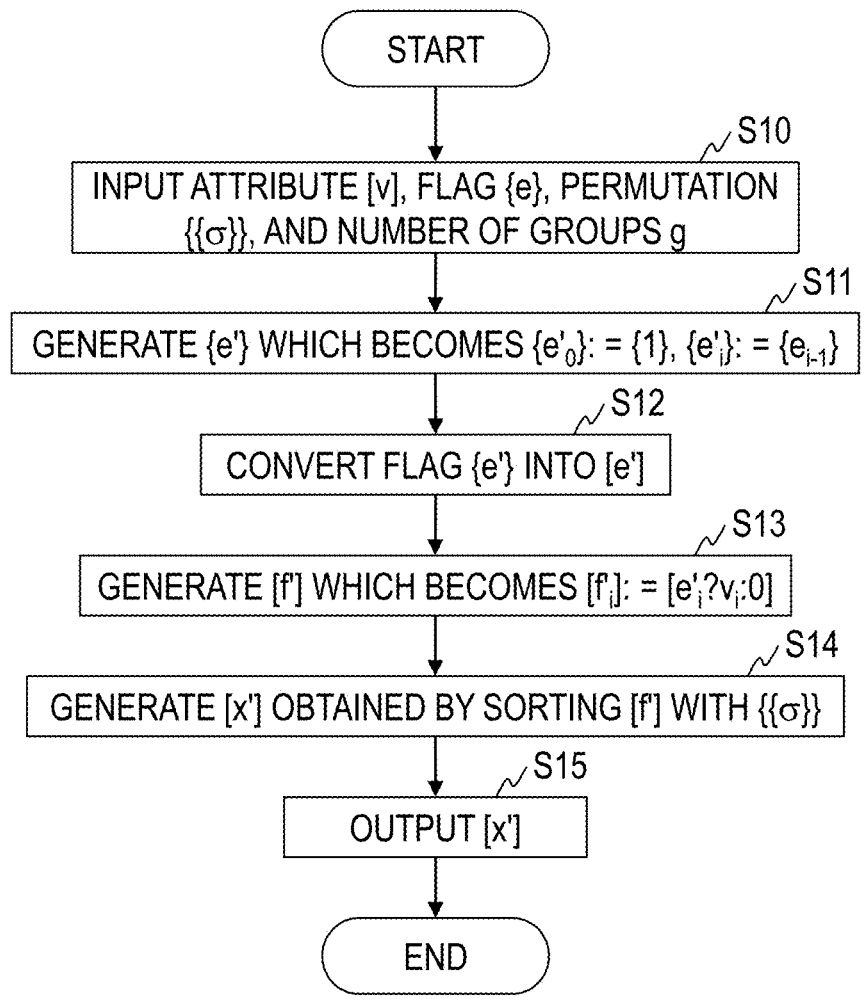
FIG. 4 is a diagram illustrating a processing procedure of a secure aggregate minimum method.

A processing procedure of the secure aggregate minimum method to be executed by the secure aggregate minimum system 101 of the second embodiment will be described with reference to FIG. 4.

In step S10, the input part 10 of each secure computation apparatus $2_n$ receives a share $[v] \in [F]^m$ obtained by concealing a value attribute $v \in F^m$ through secret sharing, a share $\{e\} \in \{B\}^m$ obtained by concealing a flag $e \in B^m$ through secret sharing, a share $\{\{\sigma\}\} \in \{\{S_m\}\}$ obtained by concealing a permutation $\sigma$ through secret sharing, and a maximum number of groups g, as input. The input part 10 outputs the share $\{e\}$ of the flag e to the flag shifting part 11, outputs the share $[v]$ of the value attribute v to the flag applying part 13, and outputs the share $\{\{\sigma\}\}$ of the permutation $\sigma$ to the sorting part 14.

In step S11, the flag shifting part 11 of each secure computation apparatus $2_n$ generates a share $\{e'\} \in \{B\}^m$ which becomes a flag $e' := e'_0, \ldots, e'_{m-1} \in B^m$, when reconstructed, by setting $\{e'_i\} := \{e_{i-1}\}$ for each integer i equal to or greater than 1 and equal to or less than m−1 and setting $\{e'_0\} := \{1\}$ using the share $\{e\}$ of the flag e. Because the flag e' is a flag obtained by shifting the flag e indicating the last element of each group backward one by one, the flag e' becomes a flag indicating a first element of each group (that is, an element immediately after the boundary between groups). The flag shifting part 11 outputs the share $\{e'\}$ of the flag e' to the flag converting part 12.

In step S12, the flag converting part 12 of each secure computation apparatus $2_n$ converts the share $\{e'\} \in \{B\}^m$ of the flag e' into a share $[e'] \in [F]^m$ through secret sharing on an arbitrary ring F. The flag converting part 12 outputs the share $[e']$ of the flag e' to the flag applying part 13.

In step S13, the flag applying part 13 of each secure computation apparatus $2_n$ generates a share $[f'] \in [F]^m$ which becomes a vector $f' := f'_0, \ldots, f'_{m-1} \in F$, when reconstructed, by setting $[f'_i] := [e'_i ? v_i : 0]$ for each integer i equal to or greater than 0 and equal to or less than m−1 using the share $[v]$ of the value attribute v and the share $[e']$ of the flag e'. In other words, when $[e'_i]$ is true (for example, $[e'_i]=[1]$), $[f'_i]:=[v_i]$ is set, while, when $[e'_i]$ is false (for example, $[e'_i]=[0]$), $[f'_i]:=[0]$ is set. A value set when $[e'_i]=[0]$ does not have to be 0, and may be any value if the value is a value which the value attribute v never takes. The vector f' becomes a vector in which, when the table is stably sorted with the key attribute, and records having the same value of the key attribute are put into the same group, at a first element $f'_i$ of each group, a value $v_i$ of the value attribute corresponding to the element is set, and 0 is set at other elements. In other words, the vector f' becomes a vector which has a minimum of each group and 0 as elements. The flag applying part 13 outputs the share $[f']$ of the vector f' to the sorting part 14.

In step S14, the sorting part 14 of each secure computation apparatus $2_n$ generates a share $[\sigma(f')] \in [F]^m$ which becomes a sorted vector $\sigma(f')$ obtained by sorting the vector f' with the permutation $\sigma$, when reconstructed, using the share $[f']$ of the vector f' and the share $\{\{\sigma\}\}$ of the permutation $\sigma$. Hereinafter, there is a case where each element of $[\sigma(f')] \in [F]^m$ is referred to by $[\sigma(f')_i] \in [F]$ (i=0, ..., m−1). The sorted vector $\sigma(f')$ becomes a vector in which, at elements corresponding to the number of groups from the head, a value of a first element (that is, a minimum of each group) when the table is sorted for each group, is set, and at subsequent elements, 0 is set. The sorting part 14 outputs the share $[\sigma(f')]$ of the sorted vector $\sigma(f')$ to the output part 15.

In step S15, the output part 15 of each secure computation apparatus $2_n$ generates a share $[x'] \in [F]^{min(g,m)}$ which becomes a vector $x' := \sigma(f')_0, \ldots, \sigma(f')_{min(g,m)-1}$ representing a minimum of each group, when reconstructed, from the share $[\sigma(f')]$ of the sorted vector $\sigma(f')$, and outputs the share $[x']$ of the minimum x'.

Modification

In the above-described embodiments, a configuration has been described where the share $[v]$ of the value attribute v, the share $\{e\}$ of the flag e, and the share $\{\{\sigma\}\}$ of the permutation $\sigma$ are input to the input part 10. In a modification, a configuration will be described where a share obtained by concealing the table through secret sharing, or the like, is input to the input part 10, and, after the share $[v]$ of the value attribute v, the share $\{e\}$ of the flag e, and the share $\{\{\sigma\}\}$ of the permutation $\sigma$ are obtained, a group-by maximum/minimum is calculated in accordance with the procedure described in the above-described embodiments.

Figure 5:
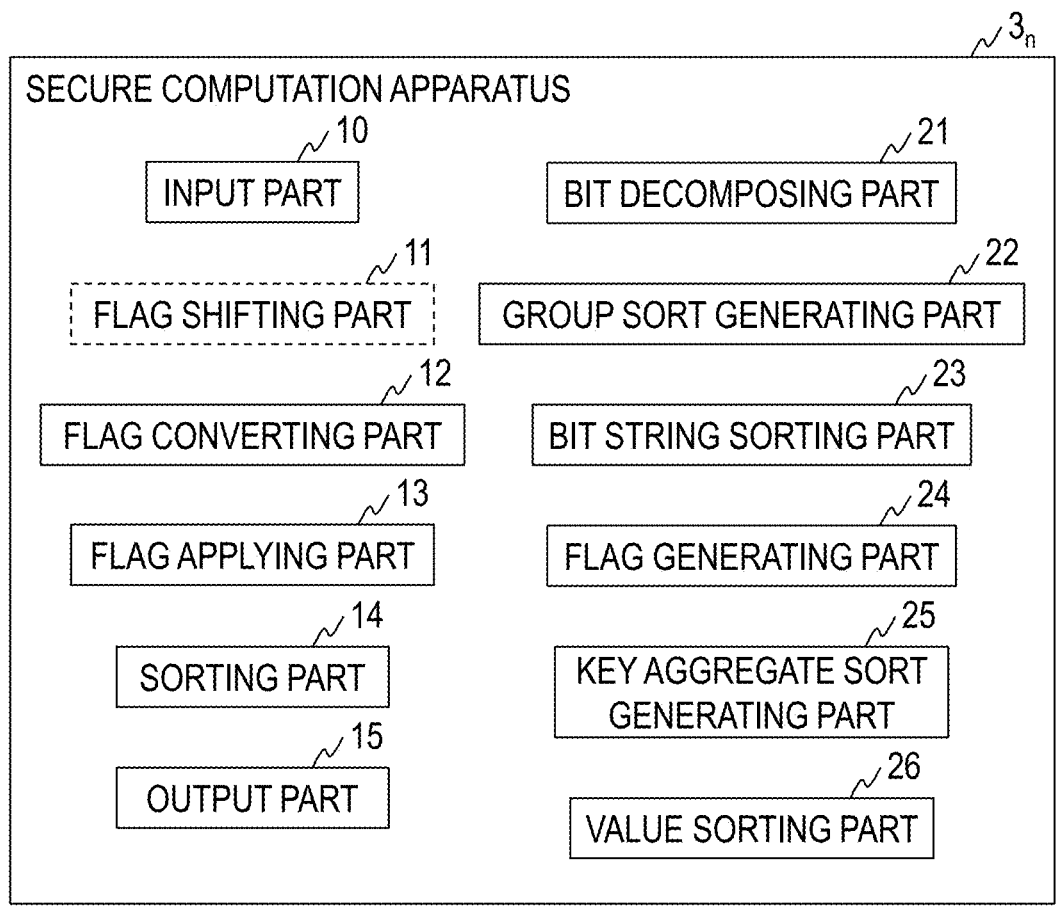
FIG. 5 is a diagram illustrating a functional configuration of a secure computation apparatus of a modification.

For example, as illustrated in FIG. 5, a secure computation apparatus $3_n$ (n=1, ..., N) of the modification includes a bit decomposing part 21, a group sort generating part 22, a bit string sorting part 23, a flag generating part 24, a key aggregate sort generating part 25 and a value sorting part 26 in addition to respective processing parts provided at the secure computation apparatus $1_n$ (n=1, ..., N) of the first embodiment and the secure computation apparatus $2_n$ (n=1, ..., N) of the second embodiment. Only a difference from the secure aggregate maximum system 100 of the first embodiment and the secure aggregate minimum system 101 of the second embodiment will be described below.

The input part 10 of each secure computation apparatus $3_n$ receives a share $[k_0], \ldots, [k_{nk-1}] \in [F]^m$ obtained by concealing each of $n_k$ key attributes $k_0, \ldots, k_{nk-1} \in F^m$ through secret sharing, and a share $[v'_0], \ldots, [v'_{na-1}] \in [F]^m$ obtained by concealing each of $n_a$ value attributes $v'_0, \ldots, v'_{na-1} \in F^m$ through secret sharing, as input. However, $n_k$ and $n_a$ are integers equal to or greater than 1. Hereinafter, there is a case where each element of $[k_j] \in [F]^m$ (j=0, ..., $n_k$−1) is referred to by $[k_{j,i}] \in [F]$ (i=0, ..., m−1). The input part 10 outputs shares $[k_0], \ldots, [k_{nk-1}]$ of the key attributes $k_0, \ldots, k_{nk-1}$ to the bit decomposing part 21. Further, the input part 10 outputs shares $[v'_0], \ldots, [v'_{na-1}]$ of the value attributes $v'_0, \ldots, v'_{na-1}$ to the value sorting part 26.

The bit decomposing part 21 of each secure computation apparatus $3_n$ bit-decomposes and concatenates the shares $[k_0], \ldots, [k_{nk-1}]$ of the key attributes $k_0, \ldots, k_{nk-1}$ and obtains a share $\{b\} \in \{B\}^\lambda$ which becomes a bit string $b := b_0, \ldots, b_{m-1} \in B^\lambda$ which is a coupled bit expression of the key attributes $k_0, \ldots, k_{nk-1}$, when reconstructed. Note that $\lambda$ is a bit length of the bit string b, and a sum of bit lengths of respective $b_i$ (i=0, ..., m−1). In other words, $\{b_i\}$ is a bit string obtained by coupling bit expression of the i-th elements $[k_{0,i}], \ldots, [k_{nk-1,i}]$ of the respective shares $[k_0], \ldots, [k_{nk-1}]$ of the key attributes $k_0, \ldots, k_{nk-1}$. The bit decomposing part 21 outputs the share $\{b\}$ of the bit string b to the group sort generating part 22.

The group sort generating part 22 of each secure computation apparatus $3_n$ generates a share $\{\{\sigma_0\}\} \in \{\{S_m\}\}$ which becomes a permutation $\sigma_0$ which stably sorts the bit string b in ascending order, when reconstructed, using the share $\{b\}$ of the bit string b. Because the bit string b is a coupled bit expression of the key attributes $k_0, \ldots, k_{nk-1}$, it can be said that the permutation $\sigma_0$ is an operation of grouping records by rearranging the records so that records having equal values of the key attributes $k_0, \ldots, k_{nk-1}$ are successive. The group sort generating part 22 outputs the share $\{b\}$ of the bit string b and the share $\{\{\sigma_0\}\}$ of the permutation $\sigma_0$ to the bit string sorting part 23. Further, the group sort generating part 22 outputs the share $\{\{\sigma_0\}\}$ of the permutation $\sigma_0$ to the value sorting part 26.

The bit string sorting part 23 of each secure computation apparatus $3_n$ obtains a share $\{b'\}\in\{B\}^\lambda$ which becomes a sorted bit string $b':=b'_0, \ldots, b'_{m-1}\in B^\lambda$ obtained by sorting the bit string b with the permutation $\sigma_0$, when reconstructed, using the share $\{b\}$ of the bit string b and the share $\{\{\sigma_0\}\}$ of the permutation $\sigma_0$. The bit string sorting part 23 outputs the share $\{b'\}$ of the sorted bit string b' to the flag generating part 24.

The flag generating part 24 of each secure computation apparatus $3_n$ generates a share $\{e\}\in\{B\}^m$ which becomes a flag $e:=e_0, \ldots, e_{m-1}\in B^m$, when reconstructed, by setting $\{e_i\}:=\{b'_i\neq b'_{i+1}\}$ for each integer i equal to or greater than 0 and equal to or less than m−2 and setting $\{e_{m-1}\}:=\{1\}$, using the share $\{b'\}$ of the sorted bit string b'. Because true is set at the flag $e_i$ if the i-th element $b'_i$ of the sorted bit string b' is different from the i+1-th element $b'_{i+1}$, the flag $e_i$ becomes a flag which indicates the last element of each group (that is, an element immediately before the boundary between groups). The flag generating part 24 outputs the share $\{e\}$ of the flag e to the key aggregate sort generating part 25. Further, the flag generating part 24 outputs the share $\{e\}$ of the flag e to the flag converting part 12 or the flag shifting part 11.

The key aggregate sort generating part 25 of each secure computation apparatus $3_n$ first generates a share $\{e''\}\in\{B\}^m$ which becomes a flag e'' which is a negation ¬e of the flag e, when reconstructed, using the share $\{e\}$ of the flag e. In other words, the key aggregate sort generating part 25 sets $\{e''_i\}:=\{\neg e_i\}$ for each integer i equal to or greater than 0 and equal to or less than m−1. Then, the key aggregate sort generating part 25 generates a share $\{\{\sigma\}\}\in\{\{S_m\}\}$ which becomes a permutation $\sigma$ which stably sorts the flag e'' in ascending order, when reconstructed, using the share $\{e''\}$ of the flag e''. The key aggregate sort generating part 25 outputs the share $\{\{\sigma\}\}$ of the permutation $\sigma$ to the value sorting part 26. Further, the key aggregate sort generating part 25 outputs the share $\{\{\sigma\}\}$ of the permutation $\sigma$ to the sorting part 14.

The value sorting part 26 of each secure computation apparatus $3_n$ generates shares $[v_0], \ldots, [v_{na-1}]$ which become sorted value attributes $v_0, \ldots, v_{na-1}$ obtained by sorting value attributes $v'_0, \ldots, v'_{na-1}$ with the permutation $\sigma_0$, when reconstructed, using shares $[v'_0], \ldots, [v'_{na-1}]$ of the value attributes $v'_0, \ldots, v'_{na-1}$ and the share $\{\{\sigma_0\}\}$ of the permutation $\sigma_0$. The value sorting part 26 outputs shares for which it is desired to compute a maximum/minimum for each group among the shares $[v_0], \ldots, [v_{na-1}]$ of the sorted value attributes $v_0, \ldots, v_{na-1}$, to the flag applying part 13 as the share [v] of the value attribute v.

While the embodiments of the present invention have been described above, it goes without saying that a specific configuration is not limited to these embodiments, and design change, or the like, within the scope not deviating from the gist of the present invention are incorporated into the present invention. Various kinds of processing described in the embodiments are executed not only in chronological order in accordance with order of description, but also executed in parallel or individually in accordance with processing performance of apparatuses which execute the processing or as necessary.

Program, Recording Medium

In a case where various kinds of processing functions of the respective apparatuses described in the above-described embodiments are realized with a computer, a processing content of the functions which should be provided at the respective apparatuses is described with a program. Then, by this program being executed with the computer, various kinds of processing functions at the above-described respective apparatuses are realized on the computer.

The program describing this processing content can be recorded in a computer-readable recording medium. As the computer-readable recording medium, any medium such as, for example, a magnetic recording apparatus, an optical disk, a magnetooptical recording medium and a semiconductor memory can be used.

Further, this program is distributed by, for example, a portable recording medium such as a DVD and a CD-ROM in which the program is recorded being sold, given, lent, or the like. Still further, it is also possible to employ a configuration where this program is distributed by the program being stored in a storage device of a server computer and transferred from the server computer to other computers via a network.

A computer which executes such a program, for example, first, stores a program recorded in the portable recording medium or a program transferred from the server computer in the storage device of the own computer once. Then, upon execution of the processing, this computer reads out the program stored in the storage device of the own computer and executes the processing in accordance with the read program. Further, as another execution form of this program, the computer may directly read a program from the portable recording medium and execute the processing in accordance with the program, and, further, sequentially execute the processing in accordance with the received program every time the program is transferred from the server computer to this computer. Further, it is also possible to employ a configuration where the above-described processing is executed by so-called ASP (Application Service Provider) type service which realizes processing functions only by an instruction of execution and acquisition of a result without the program being transferred from the server computer to this computer. Note that, it is assumed that the program in the present embodiment includes information which is to be used for processing by an electronic computer, and which is equivalent to a program (not a direct command to the computer, but data, or the like, having property specifying processing of the computer).

Further, while, in this embodiment, the present apparatus is constituted by a predetermined program being executed on the computer, at least part of the processing content may be realized with hardware.

What is claimed is:

1. A secure aggregate maximum system comprising a plurality of secure computation apparatuses, m being an integer equal to or greater than 2, [v]:= $[v_0], \ldots, [v_{m-1}]$ being a share m−1 obtained by secret sharing a desired value attribute v: $=v_0, \ldots, v_{m-1}$ when a table including a key attribute and a value attribute is stably sorted based on a value of the value attribute and a value of the key attribute, [e]: $=[e_0], \ldots, [e_{m-1}]$ being a share obtained by secret sharing a flag e: $=e_0, \ldots, e_{m-1}$ indicating that a last element of each group is true and other elements are false when the table is grouped based on the value of the key attribute, $\{\{\sigma\}\}$ being a share obtained by secret sharing a permutation $\sigma$ which moves elements so that the last elements of each group are sequentially arranged from beginning when the table is grouped based on the value of the key attribute, and g being a maximum number of the groups, each of the secure computation apparatuses comprising processing circuitry configured to:

generate a share [f] which becomes a vector f: $=f_0, \ldots, f_{m-1}$, when reconstructed, by setting $[v_i]$ at $[f_i]$ if $[e_i]$ is true, and setting a predetermined fixed value at $[f_i]$ if $[e_i]$ is false for each integer i equal to or greater than 0 and equal to or less than m−1 using the share [v] and the share [e], generate a share [σ(f)] which becomes a sorted vector σ(f) obtained by sorting the vector f with the permutation σ, when reconstructed, using the share [f] and the share {{σ}}, and generate a share [x] which becomes a vector x: $= σ(f)_0, \ldots, σ(f)_{min(g,m)-1}$ representing a maximum of each group, when reconstructed, using the share [σ(f)].

2. The secure aggregate maximum system according to claim 1, wherein F is an arbitrary ring, $n_k$ is an integer equal to or greater than 1, $[k_0], \ldots, [k_{nk-1}]$ are shares obtained by secret sharing key attributes $k_0, \ldots, k_{nk-1} \in F^m$, [v'] is a share obtained by secret sharing a desired value attribute $v' \in F^m$ before the table is sorted based on the value of the key attribute, and the processing circuitry is further configured to:

generate a share {{σ_0}} which becomes a permutation σ_0 which stably sorts a bit string b in ascending order, when reconstructed, from a share {b} which becomes the bit string b: $=b_0, \ldots, b_{m-1}$ obtained by bit-decomposing and coupling the key attributes $k_0, \ldots, k_{nk-1}$ when reconstructed, using the shares $[k_0], \ldots, [k_{nk-1}]$;

generate a share {b'} which becomes a sorted bit string b': $=b'_0, \ldots, b'_{m-1}$ obtained by sorting the bit string b with the permutation σ_0, when reconstructed, using the share {b} and the share {{σ_0}};

generate the share {e} which becomes the flag e: $= e_0, \ldots, e_{m-1}$, when reconstructed, by setting $\{e_i\} := \{b'_i \neq b'_{i+1}\}$ for each integer i equal to or greater than 0 and equal to or less than m−2 and setting $\{e_{m-1}\} := \{1\}$ using the share {b'};

generate the share {{σ}} which becomes the permutation a which stably sorts a denial ¬e of the flag e in ascending order, when reconstructed, using the share {e}; and generate a share [v] which becomes the value attribute v obtained by sorting the value attribute v' with the permutation σ_0, when reconstructed, using the share [v'] and the share {{σ_0}}.

3. A secure aggregate minimum system comprising a plurality of secure computation apparatuses, m being an integer equal to or greater than 2, [v]: $= [v_0], \ldots, [v_{m-1}]$ being a share obtained by secret sharing a desired value attribute v: $=v_0, \ldots, v_{m-1}$ when a table including a key attribute and a value attribute is stably sorted based on a value of the value attribute and a value of the key attribute, [e]: $=[e_0], \ldots, [e_{m-1}]$ being a share obtained by secret sharing a flag e: $=e_0, \ldots, e_{m-1}$ indicating that a last element of each group is true and other elements are false when the table is grouped based on the value of the key attribute, {{σ}} being a share obtained by secret sharing a permutation a which moves elements so that the last elements of each group are sequentially arranged from beginning when the table is grouped based on the value of the key attribute, and g being a maximum number of the groups, each of the secure computation apparatuses comprising processing circuitry configured to:

generate a share [e'] which becomes a flag e': $=e'_0, e'_{m-1}$, when reconstructed, by setting $[e_{i-1}]$ at $[e'_i]$ and setting true at $[e'_0]$ for each integer i equal to or greater than 1 and equal to or less than m−1 using the share [e];

generate a share [f'] which becomes a vector f': $= f'_0, \ldots, f'_{m-1}$, when reconstructed, by setting $[v_i]$ at $[f'_i]$ if $[e'_i]$ is true, and setting a predetermined fixed value at $[f'_i]$ if $[e'_i]$ is false for each integer i equal to or greater than 0 and equal to or less than m−1 using the share [v] and the share [e'];

generate a share [σ(f')] which becomes a sorted vector σ(f') obtained by sorting the vector f' with the permutation a, when reconstructed, using the share [f'] and the share {{σ}}; and generate a share [x'] which becomes a vector x': $= σ(f')_0, \ldots, σ(f')_{min(g,m)-1}$ representing a minimum of each group, when reconstructed, using the share [σ(f)].

4. The secure aggregate minimum system according to claim 3, wherein F is an arbitrary ring, $n_k$ is an integer equal to or greater than 1, $[k_0], \ldots, [k_{nk-1}]$ are shares obtained by secret sharing key attributes $k_0, \ldots, k_{nk-1} \in F^m$, and [V'] is a share obtained by secret sharing a desired value attribute $v' \in F^m$ before the table is sorted based on the value of the key attribute, and the processing circuitry is further configured to:

generate a share {{σ}} which becomes a permutation σ_0 which stably sorts a bit string b in ascending order, when reconstructed, from a share {b} which becomes the bit string b: $=b_0, \ldots, b_{m-1}$ obtained by bit-decomposing and coupling the key attributes $k_0, \ldots, k_{nk-1}$, when reconstructed, using the shares $[k_0], \ldots, [k_{nk-1}]$;

generate a share {b'} which becomes a sorted bit string b': $=b'_0, \ldots, b'_{m-1}$ obtained by sorting the bit string b with the permutation σ_0, when reconstructed, using the share {b} and the share {{σ_0}};

generate the share {e} which becomes the flag e:= $e_0, \ldots, e_{m-1}$ when reconstructed, by setting $\{e_i\}:= \{b'_i \neq b'_{i+1}\}$ for each integer i equal to or greater than 0 and equal to or less than m−2 and setting $\{e_{m-1}\} := \{1\}$ using the share {b'};

generate the share {{σ}} which becomes the permutation σ which stably sorts a denial of the flag e in ascending order, when reconstructed, using the share {e}; and generate a share [v] which becomes the value attribute v obtained by sorting the value attribute v' with the permutation σ_0, when reconstructed, using the share [v'] and the share {{σ_0}}.

5. A secure computation apparatus, m being an integer equal to or greater than 2, [v]: $= [v_0], \ldots, [v_{m-1}]$ being a share obtained by secret sharing a desired value attribute v: $=v_0, \ldots, v_{m-1}$ when a table including a key attribute and a value attribute is stably sorted based on a value of the value attribute and a value of the key attribute, [e]: $=[e_0], \ldots, [e_{m-1}]$ being a share obtained by secret sharing a flag e: $=e_0, \ldots, e_{m-1}$ indicating that a last element of each group is true and other elements are false when the table is grouped based on the value of the key attribute, {{σ}} being a share obtained by secret sharing a permutation a which moves elements so that the last elements of each group are sequentially arranged from beginning when the table is grouped based on the value of the key attribute, and g being a maximum number of the groups, the secure computation apparatus comprising processing circuitry configured to:

generate a share [f] which becomes a vector f: $=f_0, \ldots, f_{m-1}$, when reconstructed, by setting $[v_i]$ at $[f_i]$ if $[e_i]$ is true, and setting a predetermined fixed value at $[f_i]$ if $[e_i]$ is false for each integer i equal to or greater than 0 and equal to or less than m−1 using the share [v] and the share [e], generate a share [σ(f)] which becomes a sorted vector σ(f) obtained by sorting the vector f with the permutation σ, when reconstructed, using the share [f] and the share {{σ}}, and generate a share [x] which becomes a vector x: = $\sigma(f)_0, \ldots, \sigma(f)_{min(g,m)-1}$ representing a maximum of each group, when reconstructed, using the share [σ(f)].

6. A non-transitory computer-readable recording medium including a program recorded thereon for causing a computer to function as the secure computation apparatus according to claim 5.

7. A secure computation apparatus, m being an integer equal to or greater than 2, [v]: = $[v_0], \ldots, [v_{m-1}]$ being a share obtained by secret sharing a desired value attribute v: $=v_0, \ldots, v_{m-1}$ when a table including a key attribute and a value attribute is stably sorted based on a value of the value attribute and a value of the key attribute, [e]: $=[e_0], \ldots, [e_{m-1}]$ being a share obtained by secret sharing a flag e: $=e_0, \ldots, e_{m-1}$ indicating that a last element of each group is true and other elements are false when the table is grouped based on the value of the key attribute, {{σ}} being a share obtained by secret sharing a permutation a which moves elements so that the last elements of each group are sequentially arranged from beginning when the table is grouped based on the value of the key attribute, and g being a maximum number of the groups, the secure computation apparatus comprising processing circuitry configured to:

generate a share [e'] which becomes a flag e': $=e'_0, \ldots, e'_{m-1}$, when reconstructed, by setting $[e_{i-1}]$ at $[e'_i]$ for each integer i equal to or greater than 1 and equal to or less than m−1 and setting true at $[e'_0]$ using the share [e];

generate a share [f'] which becomes a vector f': = $f'_0, \ldots, f'_{m-1}$, when reconstructed, by setting $[v_i]$ at $[f'_i]$ if $[e'_i]$ is true, and setting a predetermined fixed value at $[f'_i]$ if $[e'_i]$ is false for each integer i equal to or greater than 0 and equal to or less than m−1 using the share [v] and the share [e'], generate a share [σ(f')] which becomes a sorted vector σ(f') obtained by sorting the vector f' with the permutation σ, when reconstructed, using the share [(f')] and the share {{σ}}; and generate a share [x'] which becomes a vector x': = $\sigma(f')_0, \ldots, \sigma(f')_{min(g,m)-1}$ representing a minimum of each group, when reconstructed, using the share [σ(f')].

8. A non-transitory computer-readable recording medium including a program recorded thereon for causing a computer to function as the secure computation apparatus according to claim 7.

9. A secure aggregate maximum method to be executed by a secure aggregate maximum system comprising a plurality of secure computation apparatuses, m being an integer equal to or greater than 2, [v]: $=[v_{m-1}]$ being a share obtained by secret sharing a desired value attribute v: $=v_0, \ldots, v_{m-1}$ when a table including a key attribute and a value attribute is stably sorted based on a value of the value attribute and a value of the key attribute, [e]: $=[e_0], \ldots, [e_{m-1}]$ being a share obtained by secret sharing a flag e: $=e_0, \ldots, e_{m-1}$ indicating that a last element of each group is true and other elements are false when the table is grouped based on the value of the key attribute, {{σ}} being a share obtained by secret sharing a permutation a which moves elements so that the last elements of each group are sequentially arranged from beginning when the table is grouped based on the value of the key attribute, and g being a maximum number of the groups, the secure aggregate maximum method comprising:

generating, by processing circuitry of each of the secure computation apparatuses, a share [f] which becomes a vector f: $=f_0, \ldots, f_{m-1}$, when reconstructed, by setting $[v_i]$ at $[f_i]$ if $[e_i]$ is true, and setting a predetermined fixed value at $[f_i]$ if $[e_i]$ is false for each integer i equal to or greater than 0 and equal to or less than m−1 using the share [v] and the share [e];

generating, by the processing circuitry of each of the secure computation apparatuses, a share [σ(f)] which becomes a sorted vector σ(f) obtained by sorting the vector f with the permutation σ, when reconstructed, using the share [f] and the share {{σ}}, and generating, by the processing circuitry of each of the secure computation apparatuses, a share [x] which becomes a vector x': $=\sigma(f)_0, \ldots, \sigma(f)_{min(g,m)-1}$ representing a maximum of each group, when reconstructed, using the share [σ(f)].

10. A secure aggregate minimum method to be executed by a secure aggregate minimum system comprising a plurality of secure computation apparatuses, m being an integer equal to or greater than 2, [v]: = $[v_0], \ldots, [v_{m-1}]$ being a share obtained by secret sharing a desired value attribute v: $=v_0, \ldots, v_{m-1}$ when a table including a key attribute and a value attribute is stably sorted based on a value of the value attribute and a value of the key attribute, [e]: $=[e_0], \ldots, [e_{m-1}]$ being a share obtained by secret sharing a flag e: $=e_0, \ldots, e_{m-1}$ indicating that a last element of each group is true and other elements are false when the table is grouped based on the value of the key attribute, {{σ}} being a share obtained by secret sharing a permutation σ which moves elements so that the last elements of each group are sequentially arranged from beginning when the table is grouped based on the value of the key attribute, and g being a maximum of the group, the secure aggregate minimum method comprising:

generating, by processing circuitry of each of the secure computation apparatuses, a share [e'] which becomes a flag e': $=e'_0, \ldots, e'_{m-1}$, when reconstructed, by setting $[e_{i-1}]$ at $[e'_1]$ for each integer i equal to or greater than 1 and equal to or less than m−1 and setting true at $[e_0]$ using the share [e];

generating, by the processing circuitry of each of the secure computation apparatuses, a share [f'] which becomes a vector f': $=f'_0, \ldots, f'_{m-1}$, when reconstructed, by setting $[v_i]$ at $[f'_i]$ if [e'] is true, and setting a predetermined fixed value at $[f'_i]$ if $[e'_i]$ is false for each integer i equal to or greater than 0 and equal to or less than m−1 using the share [v] and the share [e'];

generating, by the processing circuitry of each of the secure computation apparatuses, a share [σ(f)] which becomes a sorted vector σ(f') obtained by sorting the vector f' with the permutation σ, when reconstructed, using the share [f'] and the share {{σ}}; and generating, by the processing circuitry of each of the secure computation apparatuses, a share [x'] which becomes a vector x': $=\sigma(f')_0, \ldots, \sigma(f')_{min(g,m)-1}$ representing a minimum of each group, when reconstructed, using the share $[\sigma(f')]$.

\* \* \* \* \*